(12) United States Patent
Willis

(10) Patent No.: US 6,705,724 B1
(45) Date of Patent: Mar. 16, 2004

(54) BRIDGE OF THE NOSE EYEWEAR SUPPORT SYSTEM

(76) Inventor: Darrell Willis, 2819 Kates Ave. #B4, Bensalem, PA (US) 19020

( * ) Notice: Subject to any disclaimer, the term of this patent is extended or adjusted under 35 U.S.C. 154(b) by 0 days.

(21) Appl. No.: 10/441,312

(22) Filed: May 19, 2003

(51) Int. Cl.⁷ ................................................. G02C 5/12
(52) U.S. Cl. ........................................ 351/136; 351/139
(58) Field of Search ............................... 351/136, 138, 351/139, 124, 130, 131, 132, 79, 80, 81, 82

(56) References Cited

U.S. PATENT DOCUMENTS

| | | |
|---|---|---|
| 1,001,734 A | 8/1911 | Day |
| 1,393,152 A | 10/1921 | Miller |
| 4,070,104 A * | 1/1978 | Rice ............................. 351/138 |
| 5,771,087 A | 6/1998 | Martin et al. |
| 5,808,808 A * | 9/1998 | Yamanashi .................. 359/682 |

* cited by examiner

Primary Examiner—Huy Mai

(57) ABSTRACT

A bridge of the nose eyewear support system for providing comfortable support of eyewear and eliminating unwanted cosmetic blemishes or indentations on the side of a users nose. The bridge of the nose eyewear support system includes a central support member couplable to the bridge portion of eyewear, which is designed for resting on a bridge of a user's nose, and providing a single contact interface between the bridge portion of the eyewear and the user's nose.

19 Claims, 4 Drawing Sheets

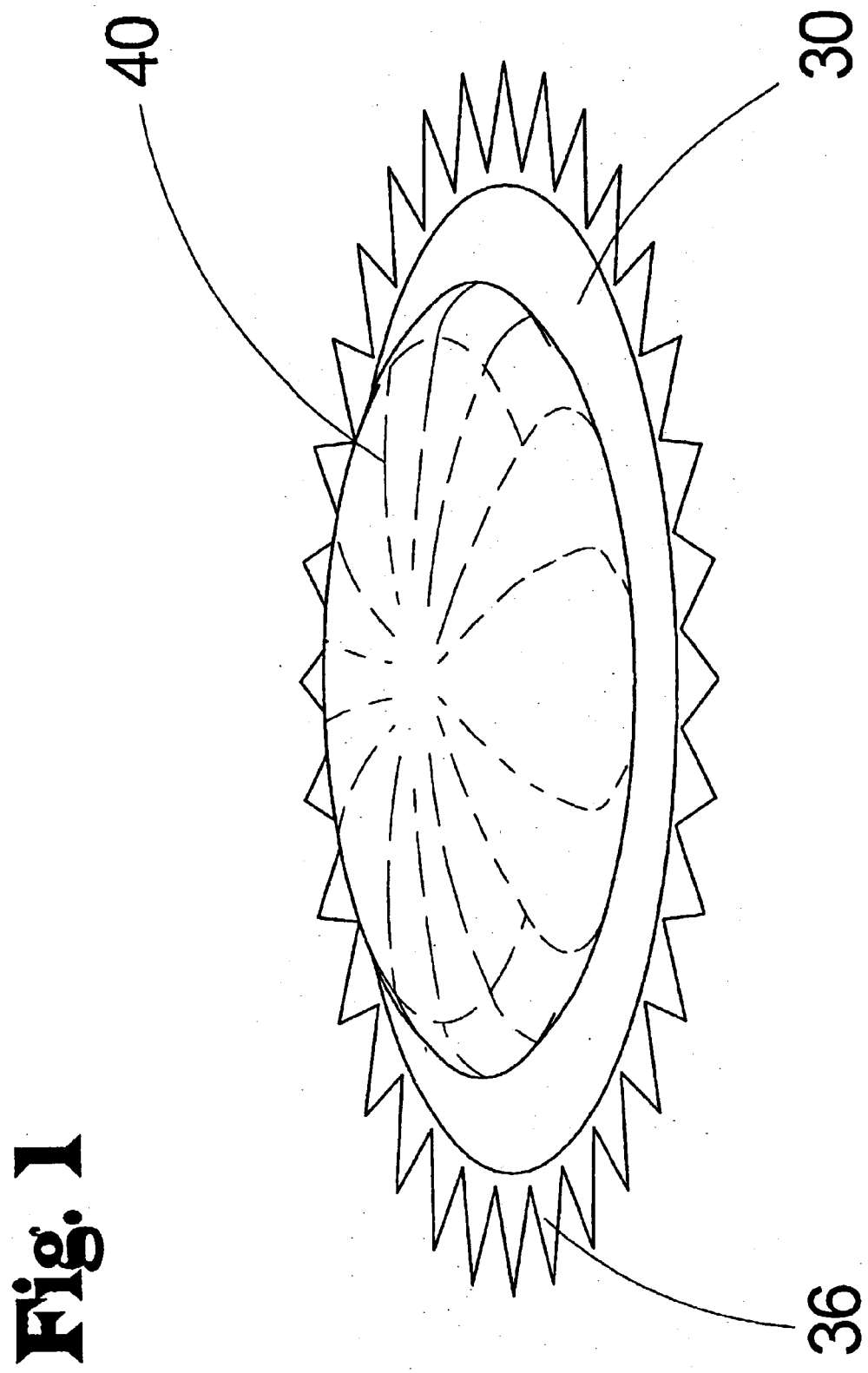

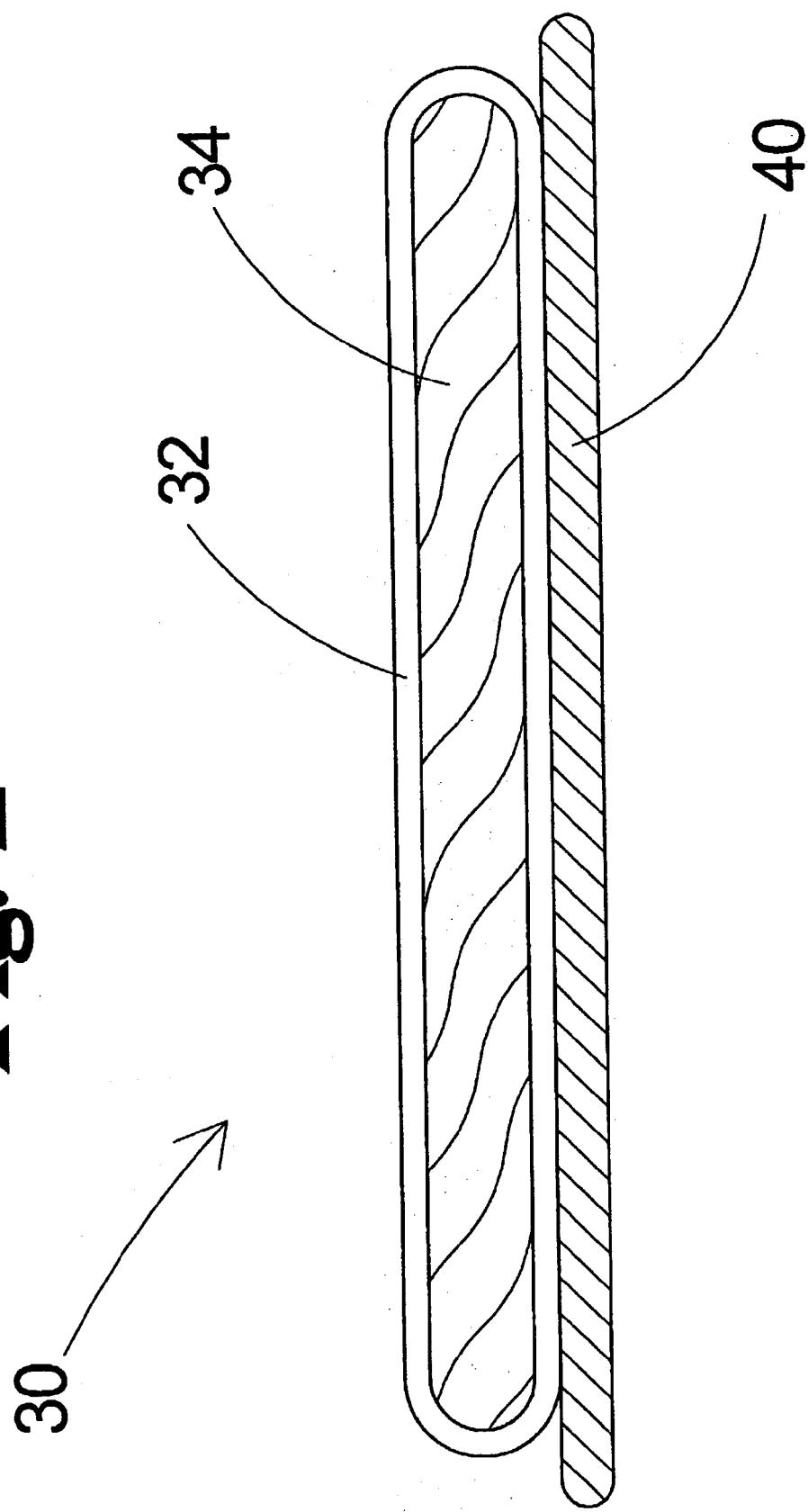

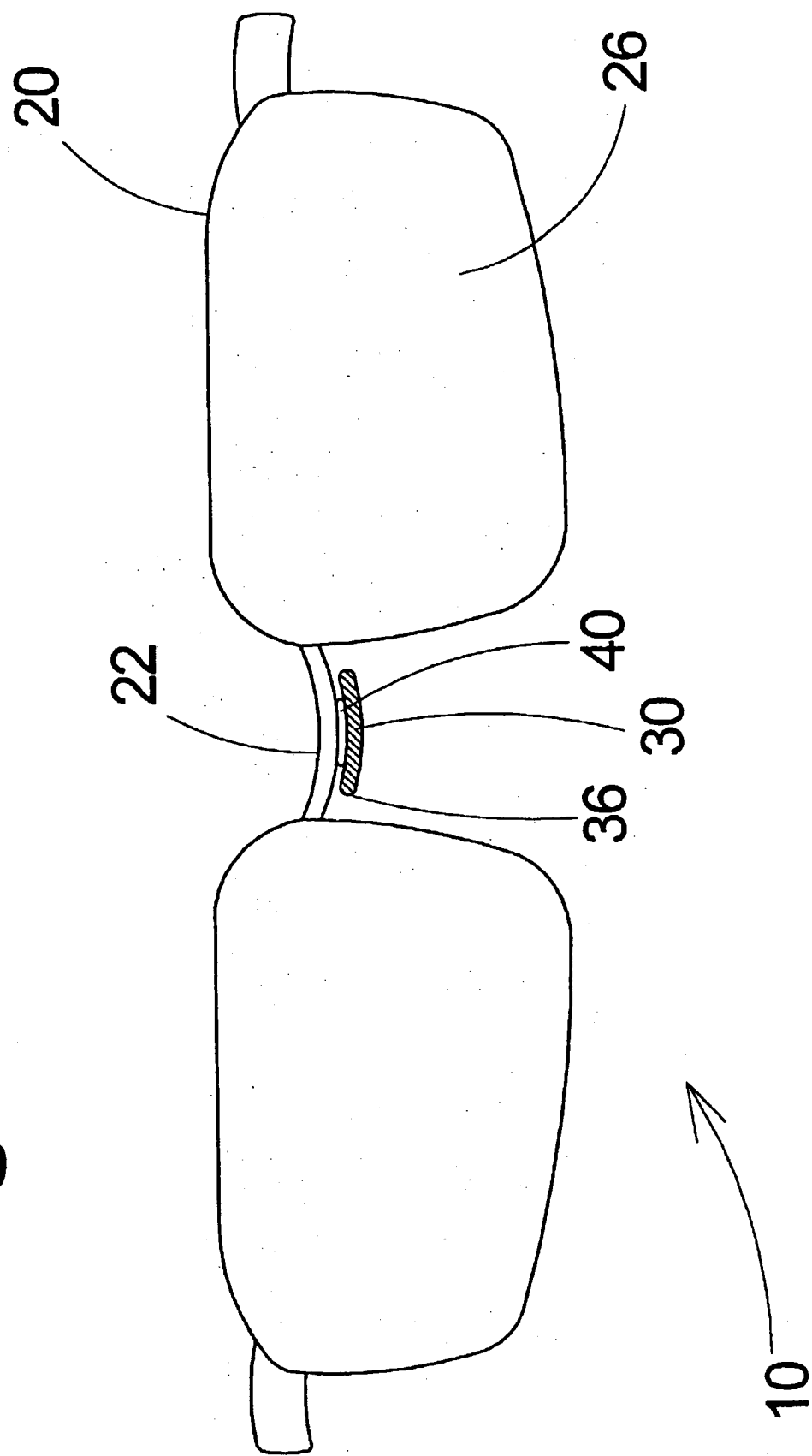

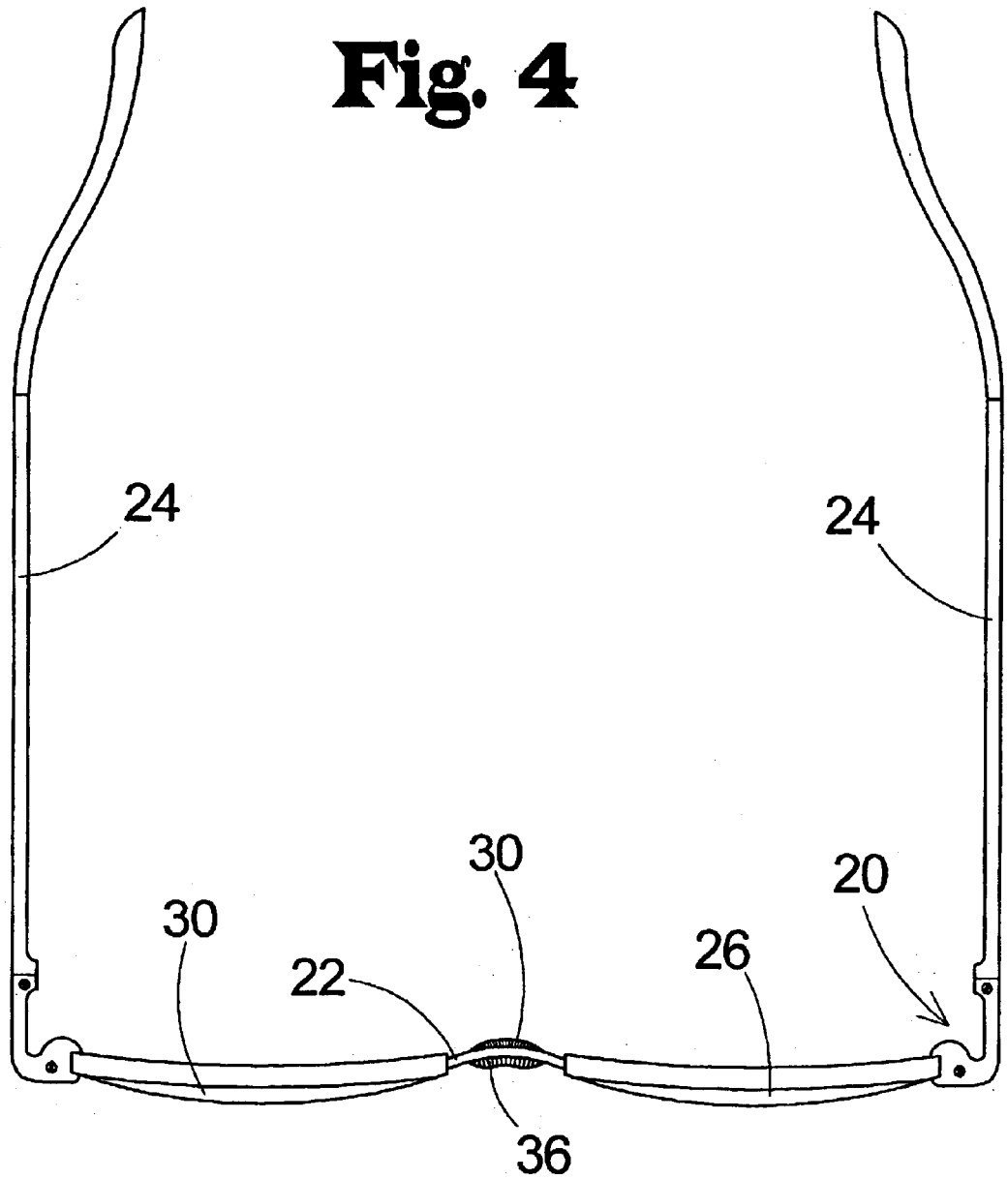

BRIDGE OF THE NOSE EYEWEAR SUPPORT SYSTEM

BACKGROUND OF THE INVENTION

1. Field of the Invention

The present invention relates to eyeglasses and more particularly pertains to a new bridge of the nose eyewear support system for providing comfortable support of eyewear and eliminating unwanted cosmetic blemishes or indentations on the side of a users nose.

2. Description of the Prior Art

The use of eyeglass supports is known in the prior art. U.S. Pat. No. 1,393,152 describes a nose guard device extending along a bridge of a users nose. Another type of eyeglass supports is U.S. Pat. No. 5,771,087 having a large nosepad to cushion against impact.

While these devices fulfill their respective, particular objectives and requirements, the need remains for a system that is superior in that it does not impair the appearance of the user, through large or multiple areas of contact.

SUMMARY OF THE INVENTION

The present invention meets the needs presented above by providing a small cushioning pad which is minimally visible when in use.

Still yet another object of the present invention is to provide a new bridge of the nose eyewear support system that may be used with alternate bridge configurations to help facilitate single point contact.

Even still another object of the present invention is to provide a new bridge of the nose eyewear support system that includes multiple protrusions to enhance the frictional interface between the eyewear and the user's nose.

To this end, the present invention generally comprises comprising a central support member couplable to the bridge portion of eyewear, which is designed for resting on a bridge of a user's nose, and providing a single contact interface between the bridge portion of the eyewear and the user's nose.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new bridge of the nose eyewear support system according to the present invention.

FIG. 2 is a schematic cross-sectional of the present invention.

FIG. 3 is a schematic top view of an embodiment the present invention incorporating the frame assembly.

FIG. 4 is a schematic front view of an embodiment the present invention incorporating the frame assembly.

DESCRIPTION OF THE PREFERRED EMBODIMENT

With reference now to the drawings, and in particular to FIGS. 1 through 4 thereof, a new bridge of the nose eyewear support system embodying the principles and concepts of the present invention and generally designated by the reference numeral 10 will be described.

As best illustrated in FIGS. 1 through 4, the bridge of the nose eyewear support system 10 generally comprises a frame assembly 20 for housing a pair of lenses 26. The frame assembly 20 has a bridge portion 22, and a pair of temple members 24, which facilitate locating the eyewear on a head of a user.

A central support member 30 is preferably couplable to the bridge portion 22. The central support member 30 is designed for resting on a bridge of a user's nose. The central support member 30 provides a single contact interface between the bridge portion 22 of the eyewear and the user's nose.

Most preferably the central support member 30 is resiliently flexible. The central support member 30 may include an outer portion 32 and an inner core 34.

In an embodiment the inner core 34 comprises silicone.

In a further embodiment the central support member 30 is elliptical to facilitate the interface between the bridge portion 22 and the bridge of the user's nose. The central support member 30 may have a length of approximately $1/16^{th}$ of an inch, to match a thickness of the bridge portion 22 of the frame 20 and a width of approximately $2/16^{th}$ of an inch.

An adhesive member 40 may be used for selectively coupling the central support member 30 to the bridge portion 22 of the eyewear.

In an embodiment the bridge portion 22 is concave. Thus a medial portion of the bridge portion 22 is lower relative to ends of the bridge portion 22 adjacent to the lenses 26. This helps to facilitate a single point interface between the bridge portion 22 and the nose of the user.

In still a further embodiment the bridge portion 22 is arcuate. Thus a medial portion of the bridge portion 22 is distal to a plane defined by a surface of the lenses 36 relative to ends of the bridge portion 22 which are proximal to the plane.

In yet a further embodiment the central support member 30 10 has a plurality of protrusions 36 extending outwardly along a perimeter edge, the plurality of protrusions 36 enhances a grip of the central support member 30 relative to the bridge of the user's nose.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A eyewear support system couplable to eyewear having a frame assembly for housing a pair of lenses, the frame assembly having a bridge portion and a pair of temple members for locating the frame assembly on the head of the user, comprising a central support member couplable to the bridge portion, said central support being adapted for resting on a bridge of a user's nose, said central support providing a single contact interface between the bridge portion of the eyewear and the user's nose.

2. The system of claim 1, wherein said central support member having a resiliently flexible outer portion.

3. The system of claim 1, wherein said central support member having an inner core.

4. The system of claim 3, wherein said inner core comprising silicone.

5. The system of claim 1, wherein said central support member being elliptical.

6. The system of claim 5, wherein said central support member having a length of approximately $1/16^{th}$ of an inch and a width of approximately $2/16^{th}$ of an inch.

7. The system of claim 1, further comprising an adhesive member for selectively coupling said central support member to the bridge portion of the eyewear.

8. A set of eyewear comprising:
   a frame assembly for housing a pair of lenses, said frame assembly having a bridge portion, said frame assembly having a pair of temple members, said temple members facilitating locating said eyewear on a head of a user; and
   a central support member couplable to said bridge portion, said central support member being adapted for resting on a bridge of a user's nose, said central support member providing a single contact interface between the bridge portion of said eyewear and the user's nose.

9. The system of claim 8, wherein said central support member having a resiliently flexible outer portion.

10. The system of claim 8, wherein said central support member having an inner core.

11. The system of claim 10, wherein said inner core comprising silicone.

12. The system of claim 8, wherein said central support member being elliptical.

13. The system of claim 12, wherein said central support member having a length of approximately $1/16^{th}$ of an inch and a width of approximately $2/16^{th}$ of an inch.

14. The system of claim 8, further comprising an adhesive member for selectively coupling said central support member to the bridge portion of the eyewear.

15. The system of claim 8, wherein said bridge portion being concave whereby a medial portion of said bridge portion is lower relative to ends of said bridge portion adjacent to said lenses.

16. The system of claim 8, wherein said bridge portion is arcuate whereby a medial portion of said bridge portion is distal to a plane defined by a surface of said lenses relative to ends of said bridge portion proximal to said plane.

17. The system of claim 8, further comprising:
   wherein said bridge portion being concave whereby a medial portion of said bridge portion is lower relative to ends of said bridge portion adjacent to said lenses; and
   wherein said bridge portion is arcuate whereby a medial portion of said bridge portion is distal to a plane defined by a surface of said lenses relative to ends of said bridge portion proximal to said plane.

18. A set of eyewear comprising:
   a frame assembly for housing a pair of lenses, said frame assembly having a bridge portion, said frame assembly having a pair of temple members, said temple members facilitating locating said eyewear on a head of a user; and
   a central support member couplable to said bridge portion, said central support member being adapted for resting on a bridge of a user's nose, said central support member providing a single contact interface between the bridge portion of said eyewear and the user's nose;
   said central support member having a resiliently flexible outer portion;
   said central support member having an inner core;
   wherein said inner core comprising silicone;
   wherein said central support member being elliptical, said central support member having a length of approximately $1/16^{th}$ of an inch and a width of approximately $2/16^{th}$ of an inch;
   an adhesive member for selectively coupling said central support member to the bridge portion of the eyewear;
   wherein said bridge portion being concave whereby a medial portion of said bridge portion is lower relative to ends of said bridge portion adjacent to said lenses; and
   wherein said bridge portion is arcuate whereby a medial portion of said bridge portion is distal to a plane defined by a surface of said lenses relative to ends of said bridge portion proximal to said plane.

19. The system of claim 18 wherein said central support member having a plurality of protrusions extending outwardly along a perimeter edge, said plurality of protrusions enhancing a grip of said central support member relative to the bridge of the user's nose.

* * * * *